April 23, 1940.  L. MARICK  2,198,483
PNEUMATIC TIRE
Filed June 22, 1938
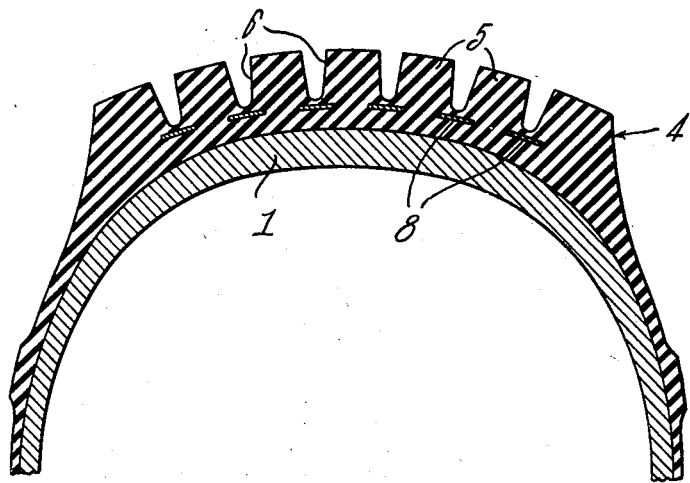
Fig. 1.
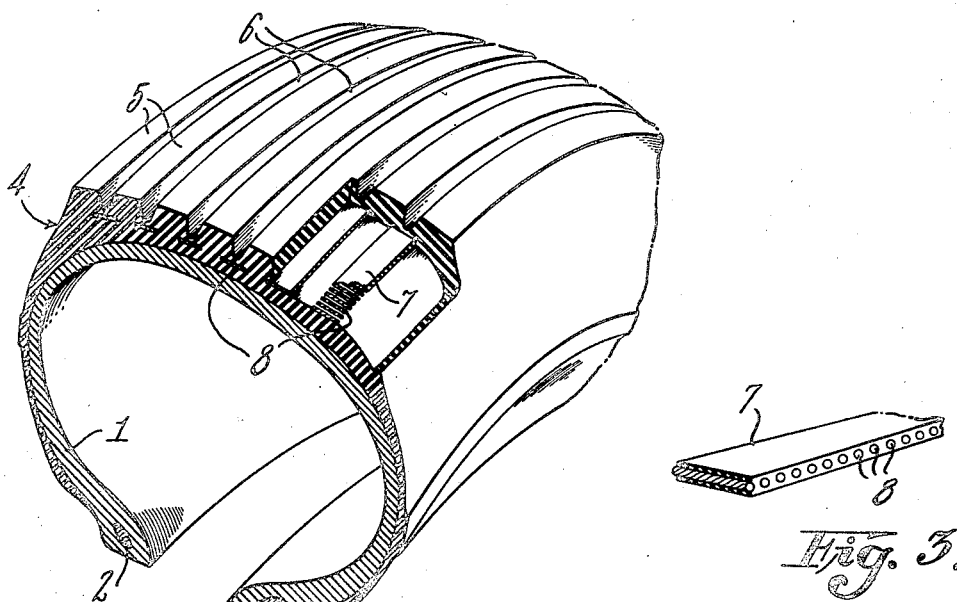
Fig. 2.
Fig. 3.
INVENTOR.
LOUIS MARICK
BY *Gourley & Rudlay*
ATTORNEYS.

Patented Apr. 23, 1940

2,198,483

UNITED STATES PATENT OFFICE 2,198,483

PNEUMATIC TIRE

Louis Marick, Grosse Pointe Farms, Mich., assignor, by mesne assignments, to United States Rubber Company, New York, N. Y., a corporation of New Jersey Application June 22, 1938, Serial No. 215,119

3 Claims. (Cl. 152—209)

This invention relates to pneumatic tires, and in particular it relates to pneumatic tires having means for reinforcing the base regions of grooves which define tread elements.

In general, the invention comprises a pneumatic tire having a carcass and a tread portion including circumferentially extending grooves and reinforcing material embedded in the tread portion between the carcass and the bases of the grooves.

In pneumatic tires, the portions of tread rubber in the region of the bases of tread grooves are subjected to greater tension strains than the remaining portions of the tread. As a result of this strain during operation of the tire, cracks appear at the bases of the grooves. In some cases the cracks become extensive and are detrimental to the proper functioning of the tire.

Attempts have been made to reduce cracking at the bases of the tread grooves by providing a softer rubber composition or by providing laminations of different rubber compositions. The present invention provides an alternative tire construction.

In accordance with the practice of my invention, I provide a reinforcing medium in the form of fibrous material embedded in the rubber composition of the tread, below the tread groove; the fibrous material having strain resisting elements extending in a direction substantially transverse of the circumferentially extending groove. By this arrangement the region at the base of the groove is relieved of excessive tension strains, resulting in a substantial decrease in tread groove cracking.

It is, therefore, among the objects of my invention to prevent objectionable cracking at the base regions of tread grooves; to permit the use of harder tread stocks; and, to attain more efficient tire performance through more uniform distribution of strains throughout the tire tread.

These and other objects and advantages will appear more fully in the following detailed description when considered in connection with the accompanying drawing, in which:

Fig. 1 is a transverse view, in section, of a portion of a pneumatic tire embodying the features of my invention;

Fig. 2 is a perspective view, partly in section and partly broken away, of a pneumatic tire embodying the improved features of my invention; and, Fig. 3 is a perspective view, partly in section, of a portion of reinforcing material.

Referring to the drawing, and in particular to Figs. 1 and 2, I show the features of my invention embodied in a pneumatic tire comprising a carcass 1 of strain resisting elements, inextensible bead members 2 and 3, and a tread 4. Formed in the tread 4 are a plurality of circumferentially extending ribs 5 defining tread grooves 6. Due to the formation of the grooves 6 the tread is of lesser thickness when measured from the base of the grooves than when measured from the top of the ribs. It is, therefore, obvious that inflation pressure within the tire and flexing of the tire while in operation result in the concentration of tension strains in those regions of the tread which lie adjacent to the bases of the tread grooves.

In order to distribute tension strains more uniformly throughout the tread, I provide a reinforcing material embedded in the tread composition and restricted to those regions of the tread where strains are concentrated. The reinforcing material is in the form of a strip 7 of rubber composition having embedded therein a fabric composed of transversely extending strain resisting elements illustrated in the form of cords 8 formed of twisted fibers. No weft thread is used to maintain the cords 8 in spaced parallel relation, the relationship being maintained by the rubber composition. Preferably, the cords are of cotton and of a gauge of .030 inch. Before the strips 7 including the cords 8 are applied to the tire, the spacing of the cords is in the order of 13 ends per inch, and the length of the cords transversely of the strip is about .50 inch.

Preferably, the strip 7 of cord material is formed of rubberized fabric such as that used for the fabric plies of tires, except that the rubber which encases the cords is of a composition substantially similar to the tread stock. While I have referred to cotton cords as forming the reinforcing elements, it is to be understood that other materials may be substituted therefor, and that materials such as silk or continuous filaments of synthetic silk are contemplated as equivalents of cotton cords.

In assembling the strip 7 including the cords 8 with the remaining portion of the tire, it is to be understood that any convenient method may be employed. For example, the tread may be applied to the carcass 1 in layers and the strips 7 may be applied to the surface of one of the layers.

In the arrangement of the strips in the tread it is desirable to locate the reinforcing material relatively close to the bases of the tread grooves. In actual practice I find it preferable to maintain a distance from the base surface of each tread groove to the top surface of the associated strip of from .03 inch to .10 inch. A least, the strip should be located closer to the base of the groove than to the top surface of the carcass.

When the strips 7 are vulcanized with the tread, the rubber composition of the strips merges with the tread rubber and loses its identity, leaving the cords 8 individually suspended in the tread.

The function of cords 8 in the tread is to strengthen those portions of the tread in the regions of the groove bases, and consequently to direct additional strains to the rubber composition of the ribs 5. Thus, the invention causes a more uniform distribution of stresses throughout the entire tread. Since cracking of rubber is a primary result of continual flexing and straining, it follows that a better distribution of stresses throughout the tread greatly lessens tread cracking and its accompanying disadvantages. In actual comparative experiments a conventional tire indicated at least five times more cracks than a tire embodying the features of my invention.

While I have shown and described a preferred embodiment of my invention, it is to be understood that it is susceptible of modifications as indicated by the scope of the appended claims.

Having thus described my invention, what I claim and desire to protect by Letters Patent is:

1. A pneumatic tire comprising a carcass of strain resisting elements, a body of tread rubber composition having its road engaging portion provided with grooves defining antiskid elements, and individual strips of reinforcing material embedded in the tread rubber between the bases of at least some of the grooves and said carcass, said reinforcing material being composed of fibers extending in a transverse direction relative to said grooves and of a length less than the distance between adjacent grooves.

2. A pneumatic tire comprising a carcass of strain resisting elements, a body of tread rubber composition having its road engaging portion provided with grooves defining antiskid elements, and strips of reinforcing material composed of fibers extending in a transverse direction relative to said grooves, and of a length less than the distance betwen adjacent grooves, embedded in the tread rubber between the bases of at least some of the grooves and said carcass, and lying closer to the bases of the grooves than to the carcass.

3. A pneumatic tire comprising a carcass of strain resisting elements, a body of tread rubber composition having its road engaging portion provided with grooves defining antiskid elements, and cords embedded in the tread rubber between the bases of at least some of the grooves and said carcass, said cords lying in spaced parallel relation and extending in a transverse direction relative to said grooves and being of a length less than the distance between adjacent grooves.

LOUIS MARICK.